United States Patent [19]

Neukom et al.

[11] 4,293,043
[45] Oct. 6, 1981

[54] SOIL UNDERCUTTER WITH TRIP RELEASE FOR PIVOTALLY MOUNTED SHANK

[75] Inventors: Chester G. Neukom, Jamestown; Ivyl D. Kopecky, Ypsilanti, both of N. Dak.

[73] Assignee: Haybuster Manufacturing, Inc., Jamestown, N. Dak.

[21] Appl. No.: 74,818

[22] Filed: Sep. 12, 1979

[51] Int. Cl.³ .............................................. A01B 61/04
[52] U.S. Cl. ..................................... 172/267; 172/720
[58] Field of Search ................ 172/266, 267, 268, 720

[56] References Cited

U.S. PATENT DOCUMENTS

| 247,756 | 10/1881 | Grissinger | 172/267 |
| 2,565,668 | 8/1951 | Simpson | 172/267 |
| 2,944,613 | 7/1960 | Anderson | 172/266 |
| 4,167,977 | 9/1979 | Geurts | 172/267 |

FOREIGN PATENT DOCUMENTS 557433 11/1943 United Kingdom ................ 172/267

Primary Examiner—George J. Marlo
Attorney, Agent, or Firm—Kinney, Lange, Braddock, Westman and Fairbairn

[57] ABSTRACT

The present invention relates to a shank assembly for a soil undercutter, which is similar to an extremely wide cultivator shovel which travels underneath the ground and cuts the roots from weeds and plants without substantially disturbing the surface of the ground. The shank assembly position can be adjusted by changing the length of a link which holds the shank assembly in position. As shown the link includes a spring trip with a near center type toggle trip release that prevents "floating" and will hold the blade in position until an obstacle is encountered. The shank and spring mounting rod are pivotally mounted with respect to a common pivot, and when the blade encounters an obstruction the toggle linkage releases permitting the shank to pivot rearwardly and upwardly, while the toggle linkage compresses the spring. The trip will automatically reset after the blade clears the obstruction.

7 Claims, 6 Drawing Figures

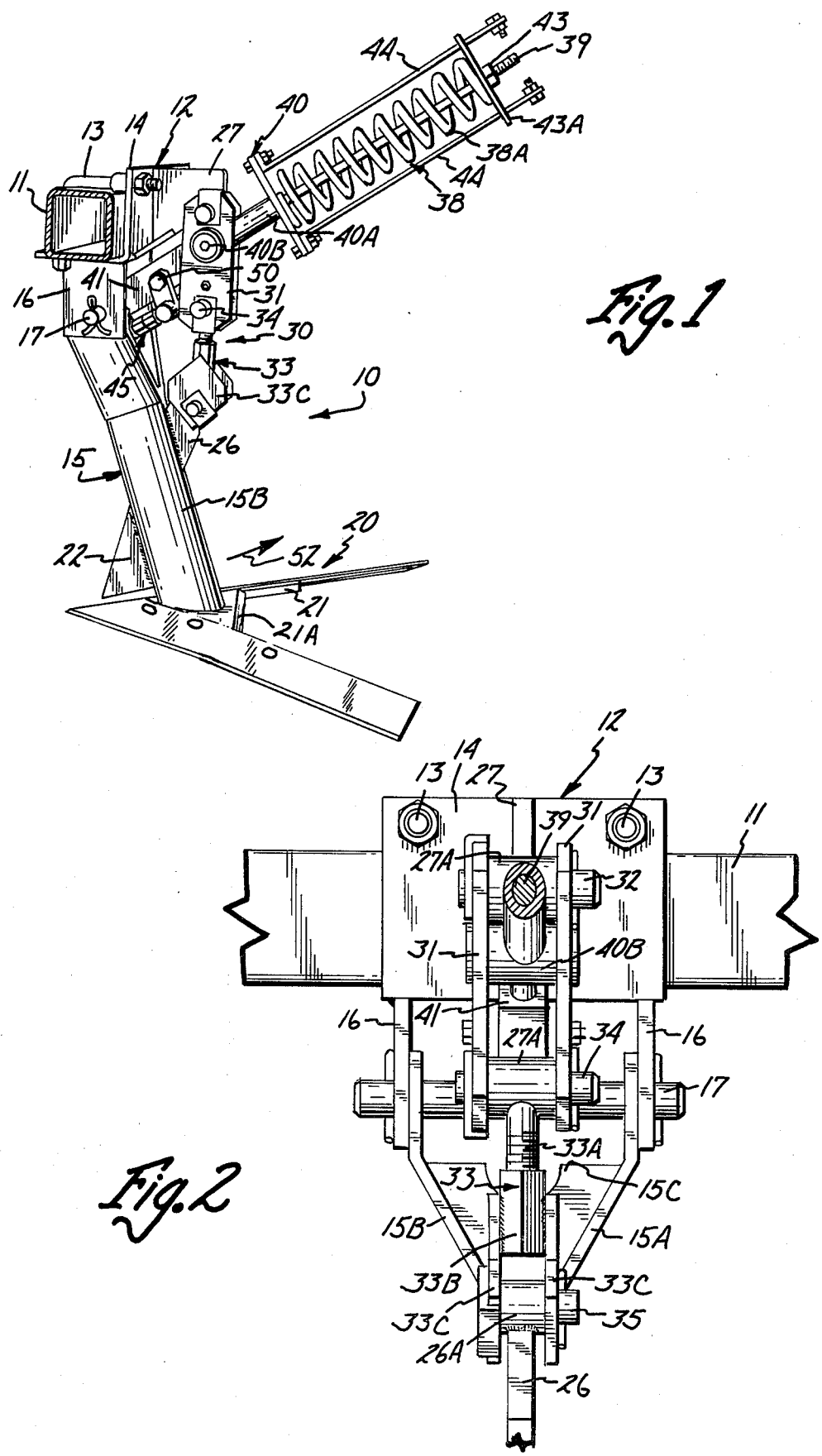

SOIL UNDERCUTTER WITH TRIP RELEASE FOR PIVOTALLY MOUNTED SHANK

BACKGROUND OF THE INVENTION

1. Field of the Invention

The present invention relates to a shank assembly pivotally mounted to a support and held in position with a link which can include a release device which relies on near center locking action, but will release under excessive loads.

2. Prior Art

Various spring trip assemblies that use near center latching type links, and which do not depend upon floating, nor upon high lift parallel linkage mechanisms have been advanced. For example U.S. Pat. No. 2,565,668 shows a spring type standard for cultivators which includes a compression spring, and a near center pivoting link arrangement.

An additional near center type linkage arrangement is shown in U.S. Pat. No. 2,944,613 in a cultivator assembly, but this device also includes some "float" for the shovel before the linkage trips.

Undercutters themselves have been known for a number of years, but generally operate with rigid shanks. The undercutter sweeps are very large, and may have a width at the back of in the range of three feet and models made by others have widths up to five to seven feet. A device forming prior art has been made by Noble Cultivators Limited of Alberta, Canada, with rigid shanks, and with very wide sweeps. A further device is the "Nichols Tool Bar Shank" which was made similar to the Noble shank, and constitutes prior art that goes back into the early 1950's. It is a rigid shank for the wide undercutter sweeps.

The undercutters generally travel from 2" to 5" below the ground surface and are designed to minimize the surface disturbance.

SUMMARY OF THE INVENTION

The present invention relates to an undercutter assembly using wide cultivator type sweeps which includes a shank that is pivotally mounted and controlled by an adjustable length link. The link preferably has a spring trip that locks into position except when overload conditions are encountered. The trip does release to permit the shovel to clear obstacles. The trip automatically resets under spring load as well. The spring trip is quite rugged to withstand the loads encountered, and the geometry is selected to minimize the spring compression while providing adequate travel for a full trip position. The trip is adjustable to permit changing the pitch of the undercutter shovel.

BRIEF DESCRIPTION OF THE DRAWINGS

FIG. 1 is a part perspective view of an undercutter shank assembly made according to the present invention;

FIG. 2 is a sectional view of the device of the invention taken as on line 2—2 in FIG. 3;

DESCRIPTION OF THE PREFERRED EMBODIMENT

The sweep and support shank assembly located generally at 10 for a soil undercutter is mounted onto a frame member 11 which can form the cross member of a conventional tool bar apparatus or similar device. The frame member, as shown, is a square tube preferably, and a clamping assembly 12 is used for holding the shank assembly onto the frame. The clamping assembly includes a pair of clamping bolts 13 that clamp onto a bracket member 14 that forms a support for the lower parts of the shank assembly.

Figure 6:
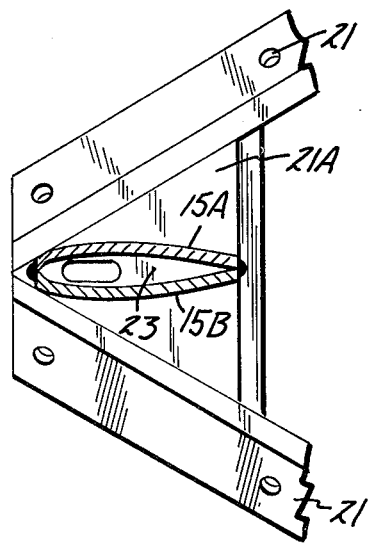
FIG. 6 is a fragmentary sectional view taken as on line 6—6 in FIG. 5 with a sweep or shovel removed.

A shank assembly 15 is formed of straight bars, that is, the shank has a straight central longitudinal axis in side view, but is inclined rearwardly from its mounting at the clamp assembly 12, to make the pivoting in a better geometrical relationship and prevent excessive digging in of the point of the sweep when the sweep trips. The shank assembly 15 is formed of a pair of bar members 15A and 15B that are placed together in the lower portions of the shank and are welded together with a passageway formed between the bars by making longitudinal bends in the center portions of each bar as shown in FIG. 6. The bars 15A and 15B are bifurcated (spread apart) at their upper portions as shown in FIG. 2, and are pivotally mounted between a pair of depending ears 16 which are fixed to the bracket member 14. The pivot mounting is on a pin 17 that forms the main pivot connection for the shank assembly. The shank assembly further includes a sweep assembly 20 (a pair of blades) that is mounted onto a frog 21 which in turn is welded to the bars 15A and 15B at the lower ends of the bars. A gusset-like guide 22 is provided slightly above the frog and sweep point and fixed to the shank assembly 15 to keep weeds from being trapped in the angle pocket formed by the front edge of the rearwardly inclined shank and the sweep. The lower edge of the gusset-like guide 22 is not welded to the frog or the sweep.

The frog 21 includes a base plate 21A that has an opening therethrough aligning with the passageway 23 between bars 15A and 15B for insertion of a tube for applying anhydrous ammonia or the like below the frog and right in back of the point or nose of the shovel, which is indicated at 23A. As can be seen, the diverging sweep blades are separated approximately two and one-half to three feet at the rear, and in this form have a nose angle, that is the angle at the front of the sweep blades of approximately 63°.

Thus the shank assembly 15, including the lower shank portion and the sweep will pivot about the pin 17 and it is normally held in its working relationship in the form shown with a spring trip or spring release linkage indicated generally at 25. The sweep has to be held securely during use because any movement about the pivot greatly changes the depth of cut at the rear of the large sweeps. Thus a toggle assembly is used. The rear portion of the shank assembly 15 includes a mounting ear 26 that is welded to the shank assembly 15, and the bracket member 14 has an upper mounting ear 27 attached thereto, and thus fixed relative to the frame member 11. It can be seen that any pivoting of the shank assembly 15 thus will cause relative movement between the ear 26 and the ear 27.

The tendency of the shank assembly 15 to move rearwardly under loads as the frame member moves forward when pulled by a tractor is resisted by the toggle linkage indicated generally at 30. The toggle linkage includes an upper link 31 that is pivotally mounted to the ear 27 on a pin 32. The link 31 comprises two side plates which straddle the ear 27 and both are mounted on the pin 32. The ear 27 has a short hub 27A welded to it and pin 32 is rotatably mounted in hub 27A.

Figure 3:
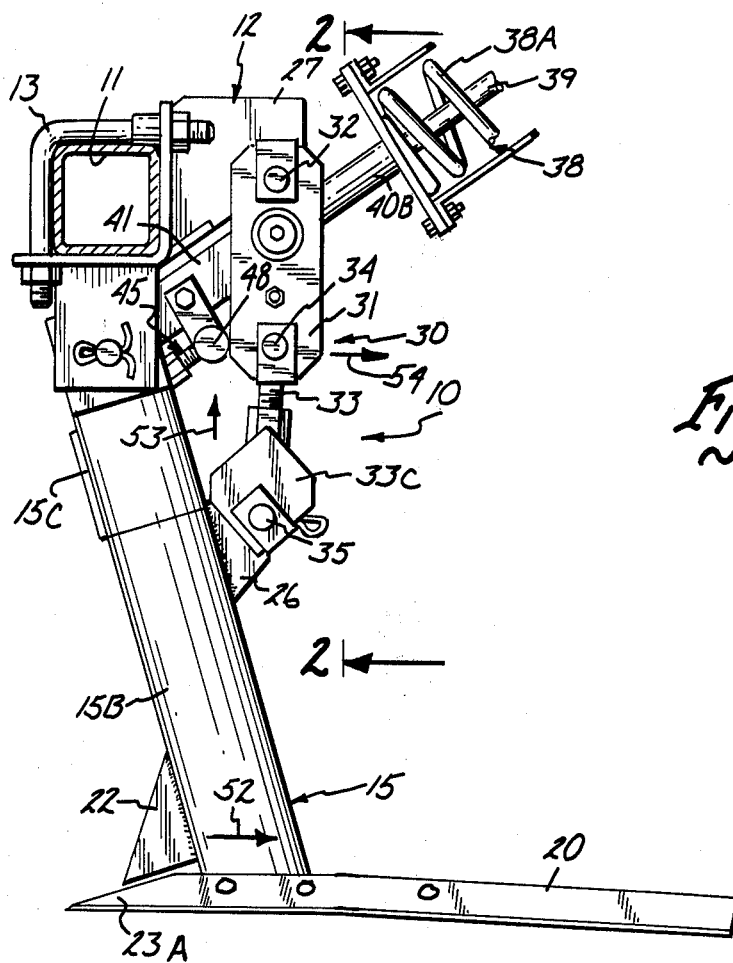
FIG. 3 is a side view of the device of FIG. 1.
Figure 4:
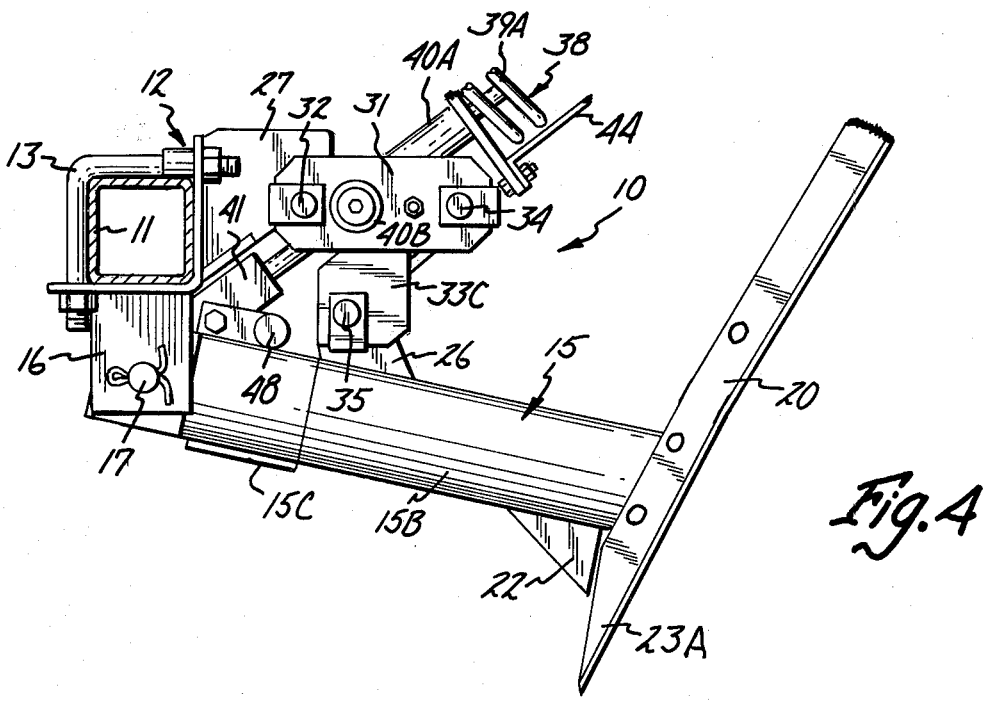
FIG. 4 is a fragmentary enlarged side view of the sweep assembly of FIG. 1 with parts in section and parts broken away to show the members thereof.
Figure 5:
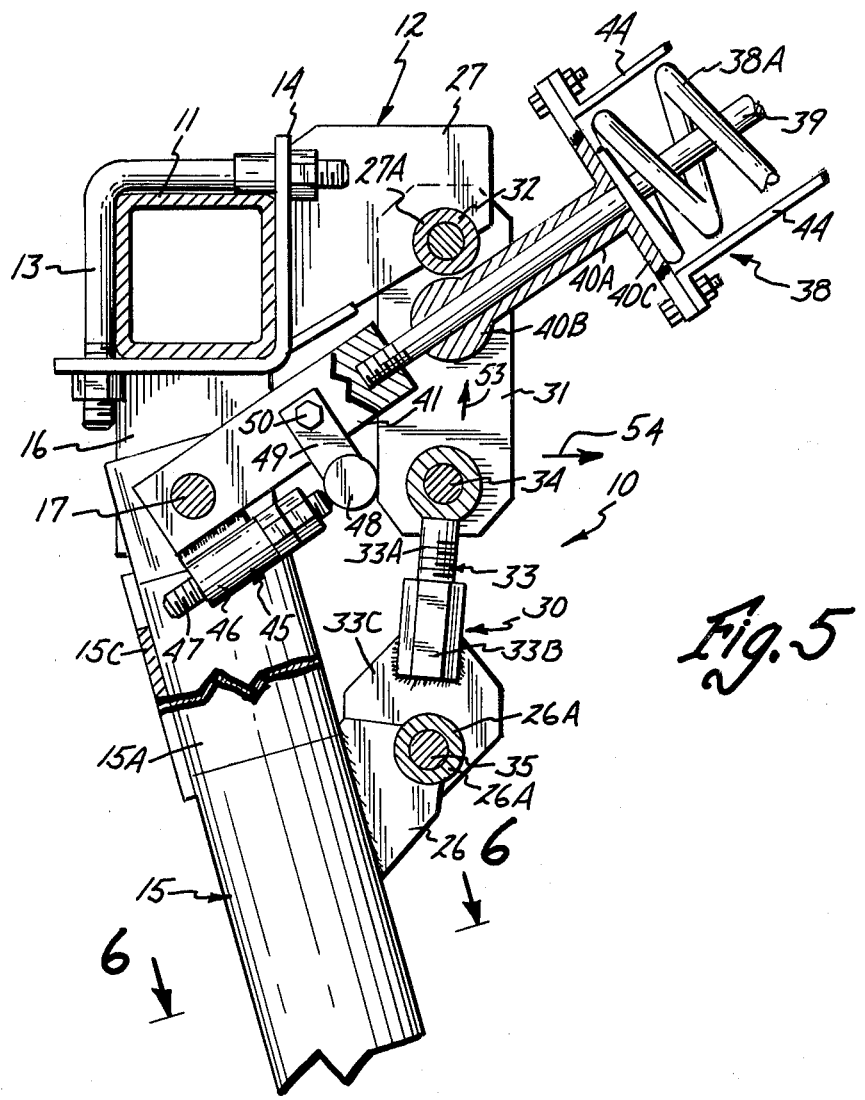
FIG. 5 is a side view of the device of FIG. 1 in a fully tripped position.

At the lower end of the link 31, and between the two plates forming the link, a second link 33 is pivotally mounted on a pin 34. The link 33 includes a threaded shank section 33A that is pivoted on the pin 34, and is threaded into a nut section 33B. The nut section 33B has a pair of mounting plates 33C attached thereto, and positioned on opposite sides of the ear 26. These plates 33C and therefore the link assembly 33 are pivoted to the ear 26 with a pin 35. The ear 26 also has a hub 26A attached to it for housing the pin 35. The pins 32, 34 and 35 are all held from rotation relative to the outer plates they pass through with suitable clips that fit over the ends of the links as shown in FIG. 4, and thus the pivoting takes place on the hubs provided for the respective links.

The tripping load for the toggle linkage is controlled by the amount of "off center" spacing of pin 34 and by the force of a spring assembly illustrated generally at 38. A compression spring 38A is mounted over a central spring mounting rod 39 and bears against a spring loader plate assembly 40 including a plate 40C and a sleeve 40A. The sleeve 40A has a cross pin 40B welded thereto. The rod 39 as shown slidably extends through sleeve 40A of the loader plate assembly 40, and also through cross pin 40B of the loader plate assembly. Sleeve 40A and the pin 40B are welded together, but are rotatably mounted on and extend between the plates forming the link 31. The end of the rod 39 is threaded into a flat link 41 which in turn is pivotally mounted on the pin 17 that mounts the shank assembly 15 to the ears 16. The flat link 41 has suitable bushing members or hubs on the opposite sides of the link to center it between the spaced upper portions of the bars 15A and 15B. It should also be noted that these upper portions of bars 15A and 15B are held rigidly together with a support plate 15C.

In any event, the link 41 is thus centered between the upper end portions of the bars 15A and 15B for the shank 15, and will pivot on the same pin as the shank.

The compression spring 38 is loaded through a nut 43 on rod 39 acting on a plate slide member 43A. Threading the nut 43 against the plate 43A changes the force of the spring 38A against the spring loader plate assembly 40 which therefore exerts a force on the link 31 through the pin 40B tending to rotate the link 31 in a counterclockwise direction, and also therefore move the pin 34 in a counterclockwise direction.

It should also be noted that there are spring safety retainer straps 44 that are slidably mounted through the plate 43A and include nuts at the outer end to prevent the spring from flying off the rod 39 in case the rod or its mounting should break. These however are merely safety stops to prevent separation of the spring from its mounting if rod 39 broke.

The movement of the pin 34 in toward the pin 17 is stopped at a desired position through a stop assembly indicated generally at 45. This stop assembly includes a threaded sleeve 46 that is welded to the flat link 41, and an adjustable stop member or threaded rod 47 that bears against a lug 48. The lug 48 is carried on the link 41 through a pair of strap members 49 that are mounted on a bolt 50 and are permitted to pivot on this bolt. The lug 48 bears against the edges of the plates forming link 31, and it in turn bears against the end of the threaded rod 47 which is stopped relative to the link 41, so that the movement of the pin 34 under the action of the spring 39 is limited by the stop member.

In fact, the movement of the pin 34 is limited so that it does not pass through nor lie along the plane defined by the axes of the pins 35 and pin 32. In other words, the pin 34 cannot go on center or over center with respect to the pins 32 and 35. The minimum spacing adjustment is approximately one-quarter of an inch away from this plane in a locked position, which will resist a substantial amount of load on the lower part of the shank assembly 15. The trip latched position can be set using a simple fixture. A straight edge may be rested on pins 32 and 35. A key or block attached to the straight edge is used to engage the pin 34 to provide a correct measure of the off center distance for the center pin. The link is not a floating type link, and it does not permit the sweep to float over objects because if it did the rear portion of the sweep would continually be lifting out of the ground and the angle of the sweep would be changing. In undercutters, it is important that the material on the upper soil surface, such as stubble or other materials, not be distrubed. This is to prevent erosion by wind and water.

However, if the load rearwardly on the shank 15 as indicated by the arrow 52 increases substantially, the force acting along the plane between pins 32 and 35, generally as indicated by the arrow 53 will tend to cause the pin 34 to move at right angles to this plane, or as shown by the arrow 54. The force in direction of arrow 54 is resisted by the spring 39 acting through the plate 40C and the sleeve 40A through pin 40B, but when this force exceeds that being exerted by the spring (note that the spring has a preselected amount of leverage on pin 34), the pin 34 will snap out of position, against the spring action. Once the pin 34 moves away from its position it will release so the sweep clears the obstacle because the component of the force represented by the arrow 54 will continue to increase as the pin moves away from its near center position.

If the trip goes to its full trip position, as shown in FIG. 4 the plates 33C will contact the edges of the plates forming link 31 and the unit will be stopped from compressing the spring excessively. The spring can be selected in length so that it will not compress flat even in full tripped position. Also note in FIG. 4 the position of the lug 48. The straps 49 and the bolt 50 have permitted the lug 48 to rest against the rear portion of the shank 15 and pivot to insure that it doesn't interfere with the action of the trip. However when the trip resets, as it will under the spring force when the obstacle has been cleared, the lug 48 will pivot back against the end of the threaded rod 47 forming a portion of the stop assembly 45.

Also, the rearward slant of the shank 15 is to place the shovel or sweep rearwardly to insure that the nose of the shovel does not dig down excessively in the ground as it pivots. The sweep nose does protrude a substantial amount ahead of the shank 15 and digging in would occur if the shank 15 was exactly vertical and the trip released. The guide 22 helps to shed weeds and prevent them from being trapped between the frog and the shank 15 and permits the shank to be sloped rearwardly in working position.

The location of the pivot in relation to the leading end of a moldboard plow so that the pivot is above the leading end of the plow share is well known in the prior art, but in undercutters with the gusset for weed clearance, the rear sloping shank provides for improved operation.

The mechanical advantage of the spring action, that is the center of action of the spring loader assembly 40 on link 31 in relation to the pivots of link 31 provide for a full tripping action without excessive compression of the spring, but yet permits applying a substantial amount of load to hold it locked in its near center position. Further, the mounting of the spring rod on the same pivot pin as the shank pivots, permits compact linkage assembly that holds the shank assembly securely in working condition and yet provides for adequate tripping capabilities.

The threading of link section 33A into nut 33B permits changing the angle of the shank assembly and thus controls the pitch of the shovel. One end of the link is removed for this adjustment. The pivoting shank may also be used with an adjustable length, but rigid, two part link between pins 32 and 35. The rigid link would hold the sweep in position without releasing, but the adjustability of length of the rigid link permits individual adjustment of the pitch of each sweep individually. The rigid link would be made much like link 33 except it would be longer. To adjust the length of link 33 it is necessary to release one end of the link so it can be turned (threaded) relative to the other section of the link.

What is claimed is:

1. A shank assembly for a cultivator or the like which must be held rigidly in place but being permitted to release under excessive loads when striking an obstacle comprising a mounting bracket, a shank, an earth working sweep mounted at the lower end of said shank, the upper end of said shank being pivotally mounted on said mounting bracket. and a toggle linkage extending between said shank and portions of said mounting bracket, including first and second links, said first link being pivotally mounted to said mounting bracket at a first end thereof, and said second link being pivotally mounted to said shank at a first end thereof, and said first and second links being pivotally mounted together at second ends thereof at a center pivot between the first ends of the respective links, spring means, means to mount said spring means to the assembly including a spring support pivotally mounted on the same pivot axis as the pivotal mounting of said shank, said spring support having an end portion remote from its pivot to support the spring means from movement in direction away from the pivot, and means slidably carried by said spring support and connected to portions of the toggle linkage and supporting the end of the spring means adjacent said spring support pivot, the spring means acting to urge the toggle linkage toward a position wherein the center pivot approaches a plane defined by the pivots of the first ends of the first and second links, and stop means to prevent the center pivot from moving toward said plane more than a desired amount.

2. The combination as specified in claim 1 wherein said shank comprises an elongated member having a generally straight central longitudinal axis inclined rearwardly from a vertical plane passing through the pivotal mounting of said shank, an earth working sweep support member fixedly attached to the lower end of said elongated member and oriented generally horizontally in a working position, and a gusset between said sweep support member and the leading edge of said elongated member to provide a leading edge surface that prevents foreign materials on the ground from packing into the pocket formed by the angular positions of the elongated member and the sweep support member junction.

3. The combination as specified in claim 1 wherein said means slidably carried by said spring support is connected to react the spring force to the first of said links between the first and second ends of said first link, and closer to the first end of said first link than the second end.

4. The combination as specified in claim 1 wherein said means slidably carried by said spring support comprises a sleeve, a pivot pin fixedly connected to said sleeve and pivotally mounted to said first link between the first and second ends of said first link.

5. The combination as specified in claim 1 wherein said stop means comprises a stop member carried by said spring support and positioned adjacent the first and second links and on an opposite side thereof from the spring when the first and second links are in a working position, said stop means including a block pivotally mounted on said spring support and positioned to react force from said first and second links to said stop member when the links reach a stopped position.

6. The combination as specified in claim 1 wherein one of said first and second links includes means to adjust the length thereof and thereby change the angular orientation of said shank and the earth working sweep about the pivotal mounting of said shank when the shank is in a working position.

7. In a shank assembly for an undercutter earth working tool utilizing a large soil undercutter sweep shaped shovel which has substantial fore and aft distance and a substantial transverse extension, comprising an elongated shank member having a generally straight longitudinal axis, a support bracket, means to pivotally mount the upper end of said shank member to said support bracket, an undercutter shovel attached to said shank member at a lower end thereof, trip release link means to control the pivotal position of said shank about its pivotal mounting to said bracket, said link means being mounted to said bracket and to a portion of said shank member and including at least two relatively pivoted sections which yield to permit the shank to pivot rearwardly and upwardly about its pivot when the undercutter shovel encounters an obstruction, the improvement comprising the trip means in working position mounting the shank so that the lower end of the shank is rearwardly from a vertical plane passing through the pivotal mounting of said shank, an undercutter shovel support member fixedly attached to the lower end of said shank member, said undercutter shovel being attached to the undercutter shovel support member and oriented generally horizontally in a working position, the undercutter shovel having a point portion with a leading point, the point portion being positioned ahead of the shank member and forming an included angle therewith of less than 90° at the junction with said shank member, the rearward positioning of the shank being sufficient so the leading point of the undercutter shovel does not extend a substantial distance forwardly of the vertical plane, and a gusset mounted on the leading edge of said shank member adjacent the undercutter shovel to provide a leading edge surface that tapers upwardly and rearwardly to guide foreign materials on the ground away from the junction of the shovel and shank member to prevent material from lodging in the junction portion.

* * * * *